(12) United States Patent
Yi et al.

(10) Patent No.: US 8,000,842 B2
(45) Date of Patent: Aug. 16, 2011

(54) METHOD TO PREVENT EXCESSIVE CURRENT DRAIN OF TELEMATICS UNIT NETWORK ACCESS DEVICE

(75) Inventors: Ki Hak Yi, Ontario (CA); John L. Dale, Fenton, MI (US); Elizabeth Chesnutt, Troy, MI (US); James Bicego, Jr., Utica, MI (US)

(73) Assignee: General Motors LLC, Detroit, MI (US)

( * ) Notice: Subject to any disclaimer, the term of this patent is extended or adjusted under 35 U.S.C. 154(b) by 985 days.

(21) Appl. No.: 11/864,358

(22) Filed: Sep. 28, 2007

(65) Prior Publication Data

US 2009/0088910 A1    Apr. 2, 2009

(51) Int. Cl.
*G05D 1/00*    (2006.01)
*G06F 19/00*    (2011.01)

(52) U.S. Cl. .................................. 701/1; 701/2; 701/35
(58) Field of Classification Search ........................ None
See application file for complete search history.

(56) References Cited

U.S. PATENT DOCUMENTS

| | | | |
|---|---|---|---|
| 6,947,732 B2 * | 9/2005 | Fraser | 455/420 |
| 6,993,351 B2 * | 1/2006 | Fraser et al. | 455/466 |
| 7,016,771 B2 * | 3/2006 | Watkins et al. | 701/1 |
| 7,142,810 B2 * | 11/2006 | Oesterling | 455/9 |
| 2003/0185162 A1 * | 10/2003 | Fraser et al. | 370/311 |
| 2004/0142659 A1 * | 7/2004 | Oesterling | 455/11.1 |
| 2006/0047373 A1 * | 3/2006 | Sumcad et al. | 701/1 |
| 2006/0241817 A1 * | 10/2006 | Patenaude | 701/1 |
| 2009/0088910 A1 * | 4/2009 | Yi et al. | 701/1 |

\* cited by examiner

*Primary Examiner* — Khoi Tran
*Assistant Examiner* — Ian Jen
(74) *Attorney, Agent, or Firm* — Leydig, Voit & Mayer, Ltd.

(57) ABSTRACT

The disclosed examples illustrate a system and method that prevent excessive current drain through the network access device (NAD) of a telematics unit and provide flexible discontinuous-receive management. Normally, when in a Standby State and where communication service is unavailable, the NAD may dissipate current at rate many times more than where communication service is available. A Standby Counter provides the length of the time interval for Standby State or the sleep cycle. Certain of the disclosed examples prevent excessive vehicle battery drain by operating the telematics unit in a first mode wherein a sleep cycle value of the telematics unit is above a first predetermined threshold, and if the communication service is available, operating the telematics unit in a second mode wherein a sleep cycle value is in a range from zero to the first predetermined threshold.

14 Claims, 9 Drawing Sheets

METHOD TO PREVENT EXCESSIVE CURRENT DRAIN OF THE NETWORK ACCESS DEVICE IN THE TELEMATICS UNIT

METHOD TO PREVENT EXCESSIVE CURRENT DRAIN OF THE
NETWORK ACCESS DEVICE IN THE TELEMATICS UNIT

METHOD TO PREVENT EXCESSIVE CURRENT DRAIN OF THE
NETWORK ACCESS DEVICE IN THE TELEMATICS UNIT

METHOD TO PREVENT EXCESSIVE CURRENT DRAIN OF THE
NETWORK ACCESS DEVICE IN THE TELEMATICS UNIT

METHOD TO PREVENT EXCESSIVE CURRENT DRAIN OF THE
NETWORK ACCESS DEVICE IN THE TELEMATICS UNIT

METHOD TO PREVENT EXCESSIVE CURRENT DRAIN OF TELEMATICS UNIT NETWORK ACCESS DEVICE

BACKGROUND OF THE INVENTION

Wireless communication services for mobile vehicles, such as navigation and roadside assistance, have increased rapidly in recent years. Most of the services that have been offered are for a mobile vehicle in operation, but more recently, the demands and potential for services to a turned-off vehicle have grown. Services that may be requested while the vehicle is Off or in a Standby State may include maintenance and diagnostic functions, system updates, vehicle position determination, unlocking of the doors, or vehicle alarm silencing.

Normally when the mobile vehicle is off, it is placed into a powered-down discontinuous-receive (DRx) or Standby State (also called sleep cycle). A communication device and a telematics unit on or in communication with each other and with the vehicle may also be placed into a similar DRx cycle to minimize power drain on the vehicle battery. To perform a requested function while the ignition is off, the telematics unit may be awakened, the desired function performed, and the telematics unit subsequently placed back into the DRx or Standby State. For example, a telematics unit may monitor a satellite broadcast channel for a command signal. Based on the command signal, the cellular phone of telematics unit is powered up. The telematics unit may then call a telematics service provider's call center to receive then perform a service request. Alternatively, a data message sent by the call center containing a service request, may be waiting for the telematics unit when it awakes. After performing the service, the telematics unit may return to the Standby State.

A network access device (NAD) of a telematics unit communicates with a call center. In a Standby State, the NAD dissipates low current (13 mA-20 mA) when it is awakened in an "In Service" area to have the telematics unit perform functions (e.g. unlocking the vehicle doors silencing a vehicle alarm). However, when the NAD is in a "No Service" area (e.g. underground parking garage), the NAD may dissipate more than ten times the amount of current (200 mA-300 mA). Consequently, the NAD drains the vehicle battery at a faster rate, causing the NAD to enter into Off State prematurely, thereby rendering the telematics unit incapable of performing any services and potentially leaving the vehicle battery undesirably discharged.

BRIEF SUMMARY OF THE INVENTION

The disclosed examples illustrate a system and method that prevent excessive current drain through the network access device (NAD) of a telematics unit and provide flexible discontinuous-receive management. Normally, when in a Standby State and where communication service is unavailable, the NAD may dissipate current at rate many times more than where communication service is available. A Standby Counter provides the length of the time interval for Standby State or the sleep cycle. Certain of the disclosed examples prevent excessive vehicle battery drain by operating the telematics unit in a first mode wherein a sleep cycle value of the telematics unit is above a first predetermined threshold, and if the communication service is available, operating the telematics unit in a second mode wherein a sleep cycle value is in a range from zero to the first predetermined threshold.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
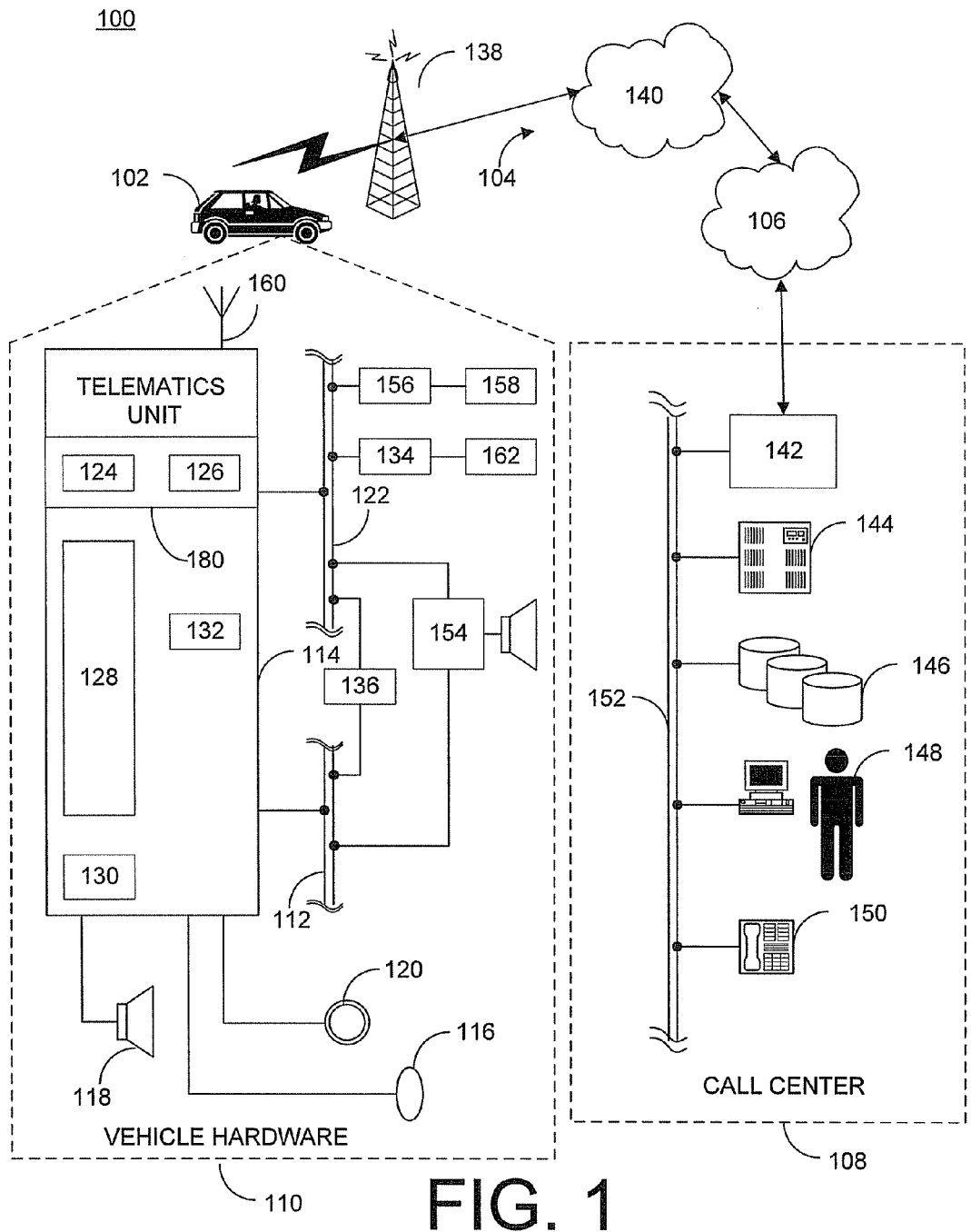
FIG. 1 is a schematic view of an example communication system within which the disclosed examples may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

A network access device of a telematics unit 114 may operate in one of at least three different states that include an On State, a Standby State, and an Off State. During an On State, a NAD 180 connects to a wireless network if it is in an "In Service" wireless area. An "In Service" area is where communication service is available to the telematics unit. If a NAD 180 is in a "No Service" wireless area, then it attempts to connect to a wireless network until it is in an "In Service" area. A "No Service" area is where communication service is unavailable to the telematics unit. When in Standby State (also called the sleep cycle), a NAD 180 dissipates low current (e.g. 13 mA-20 mA) in an "In Service" area when it is awakened for the telematics unit to perform functions (e.g. unlocking the vehicle doors, silencing a vehicle alarm). However, when a NAD 180 is in a "No Service" area (e.g. underground parking garage), a NAD 180 may dissipate many more times the amount of current (e.g. 200 mA-300 mA). Consequently, a NAD 180 may drain the vehicle battery prematurely and enter into Off State, thereby rendering the telematics unit incapable of providing any services for the vehicle driver and rendering the vehicle incapable of starting.

The length of the Standby State or sleep cycle may be determined by a vehicle's ignition cycle patterns. The telematics unit may monitor and record the length of time a vehicle is turned off and then turned on given day or week. Accordingly, the telematics unit may adjust the length of its Standby State based on daily or weekly vehicle ignition cycle patterns. In addition, a subscriber may notify a telematics service provider of a change in vehicle ignition patterns through an advisor or a provider website. For example, a subscriber may notify an advisor that the vehicle will remain in an airport parking lot for five days. Consequently, the provider may then configure the subscriber's telematics unit to have a Standby State of 5 days or 120 hours.

Using the above example, a vehicle battery may have a current "budget", or predetermined threshold of 120 hours for Standby State when the NAD 180 is in an "In Service" area with an average current drain of 20 mA per second. However, if the vehicle is parked in a "No Service" area, then the average current drain of the battery may be, for example, 200 mA per second. Consequently, the battery can last a predetermined threshold of 12 hours, instead of the budgeted 120 hours. Thus, if the vehicle is parked in a "No Service" area and the vehicle owner returns 24 hours later and finds that the keys are locked in the vehicle, the telematics unit 114 has no battery power to provide door unlocking services to the vehicle owner. Further, the vehicle owner cannot start the vehicle because the battery has been discharged.

In one aspect, the present invention can prevent shortening of the Standby State when the NAD 180 is in a "No Service" area. A Standby Counter sets the time interval of Standby State for the NAD 180 when in an "In Service" area. For example, when in an "In Service" area, the NAD may enter a mode of the Standby State whereby a Standby Counter could be set to the number of seconds in 120 hours. At the end of each second the Standby Counter is decremented by one unit value. To prevent prematurely entering Off State and draining the vehicle battery, the NAD 180 maintains a No Service Factor, e.g., equal to the ratio of the average current dissipation in a "No Service" area to the average current dissipation in an "In Service" area. For example, if the current dissipation in a "No Service" area is 200 mA and the current dissipation in an "In Service" area is 20 mA, then the No Service Factor is equal to 10. Consequently, when the NAD 180 is in a "No Service" area, it enters a different mode in the Standby State such that the NAD 180 decrements the standby counter by a value equal to the No Service Factor for every second it is in a "No Service" area.

Figure 2:
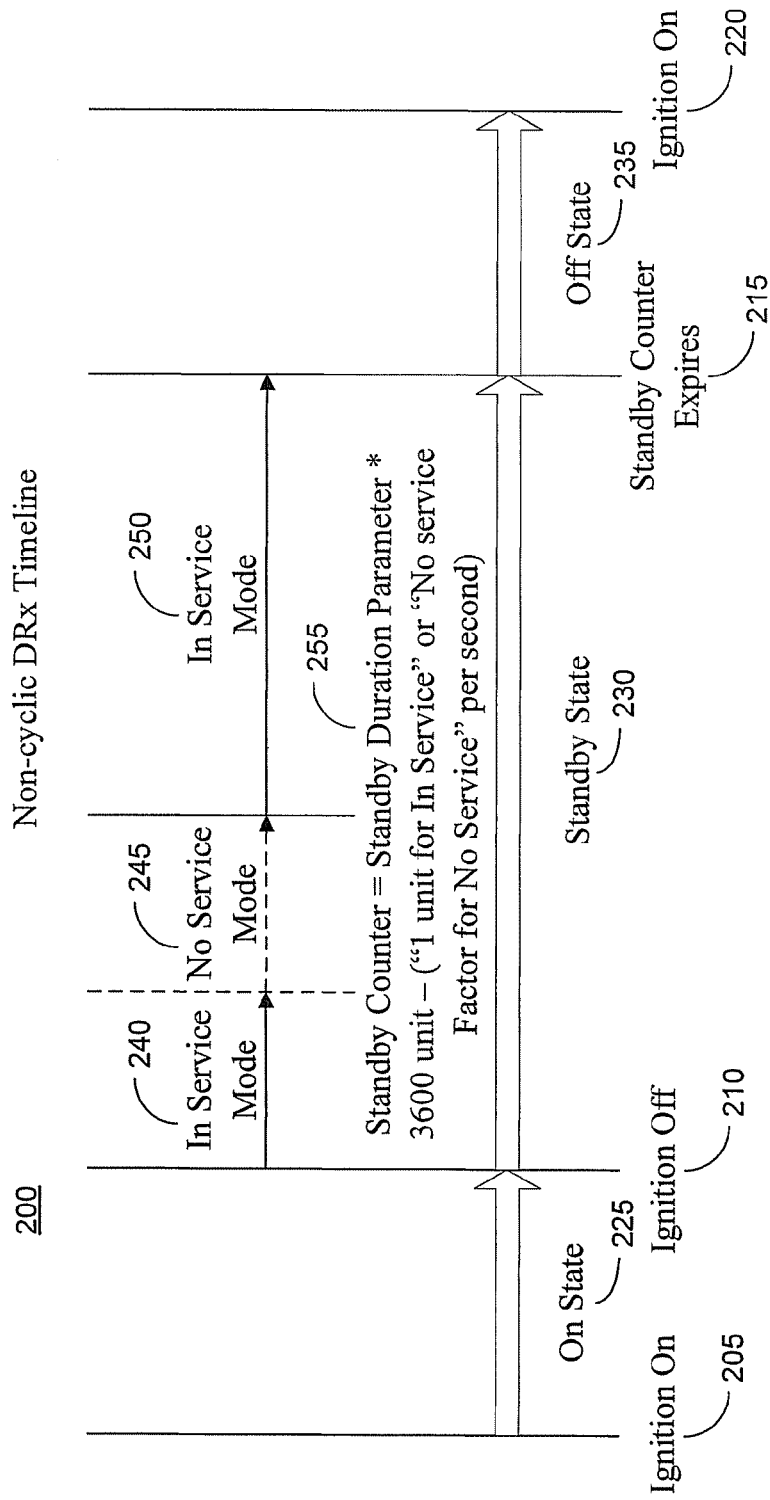
FIG. 2 is a timing diagram showing an exemplary process of modifying a standby counter in accordance with the disclosed principles.
Figure 3:
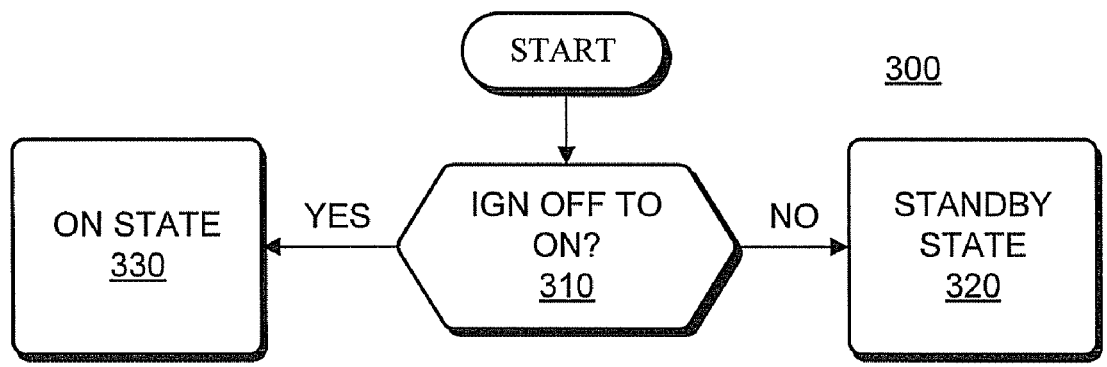
FIG. 3 is a flow diagram showing an exemplary process of switching to On State or Standby State.

FIG. 2 is a flow diagram 200 showing one example of the disclosed principles. When the ignition of the vehicle is turned on 205, a NAD 180 enters On State at 225. Once the ignition of the vehicle is turned off at 210, the NAD 180 enters Standby State at stage 230. Upon entering Standby State, the Standby Counter is set to a value equal to the Standby Duration Parameter multiplied by 3600 (255) to represent the time interval (in seconds) of the Standby State, or sleep cycle, when in an "In Service" area 240. For example, if the length of the Standby State 230 is budgeted to be 120 hours, then the Standby Duration Parameter is equal to 120 and the Standby Counter equals 120 multiplied by 3600, i.e., 432,000. For every second in this mode and in an "In service" area, the Standby Counter is decrement by a unit value at stage 255. However, when the NAD 180 enters a "No Service" area, thereby entering a different mode of the Standby State at stage 245, then the Standby Counter is decremented by a value of No Service Factor units at stage 255.

FIGS. 3-6 are flow diagrams showing an exemplary method of various aspects of the disclosed principles. In the process 300 of FIG. 3, the NAD 180 simply determines whether the ignition has turned from "off" to "on" at stage 310. If so, then the NAD 180 is in On State at stage 330. Otherwise, the NAD 180 is in Standby State at stage 320.

Figure 4:
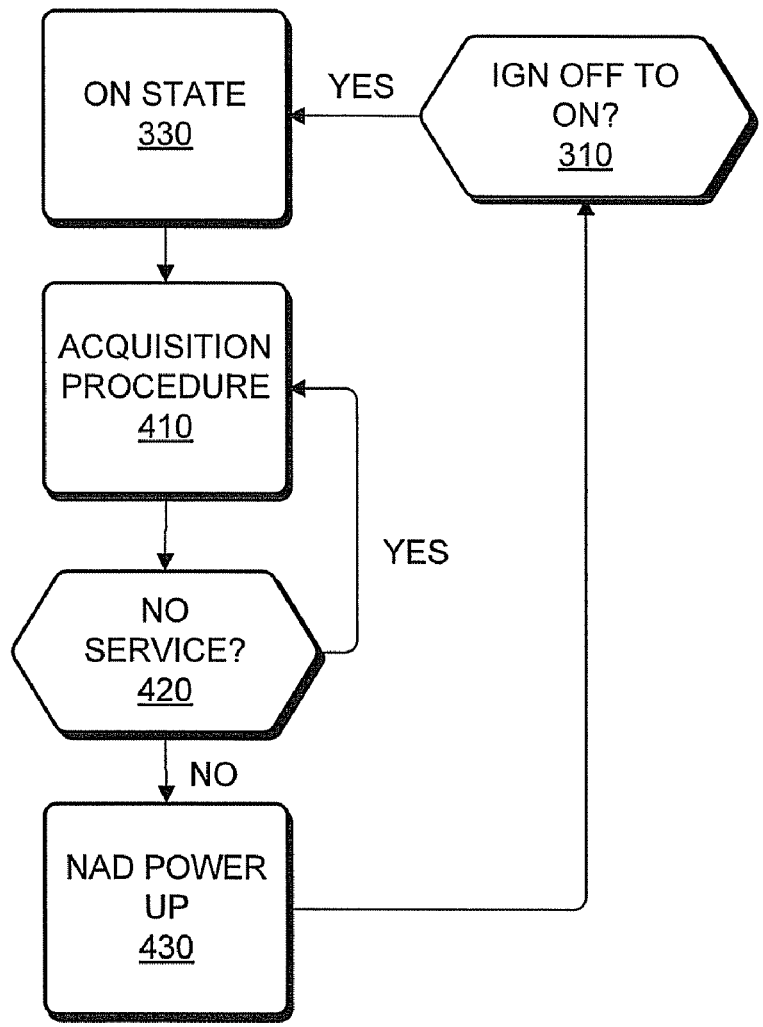
FIG. 4 is a flow diagram showing an exemplary process of searching for wireless service in accordance with the disclosed principles.

FIG. 4 describes an exemplary method within the On State 400. Assuming at stage 330 that the NAD 180 is in the On State, then at a stage 410, the NAD 180 performs an Acquisition Procedure. This procedure is designed to connect the NAD 180 to a wireless network. At a stage 420, the NAD 180 determines whether it is within a "No Service" area. If so, it repeats the Acquisition Procedure 410. However, if the NAD 180 is not in a "No Service" area (meaning it is in an "In Service" area), then at stage 430, the NAD 180 powers up the telematics unit to perform its services until the ignition of the vehicle is turned "off" (310, 320).

Figure 5:
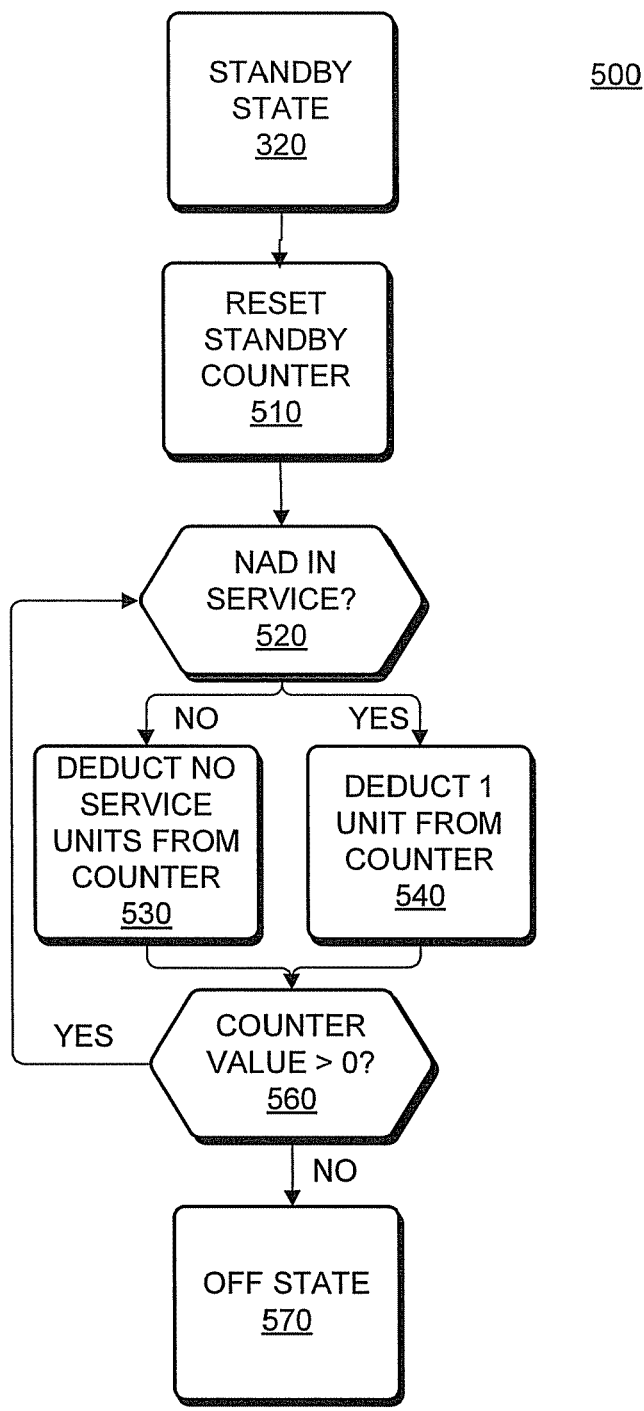
FIG. 5 is a flow diagram showing an exemplary process of decrementing a standby counter in accordance with the disclosed principles.

FIG. 5 describes an exemplary method 500 to be executed relative to the Standby State for a NAD 180. Assuming at stage 320 that the NAD 180 is in the Standby State, then at stage 510, the NAD 180 resets the Standby Counter. At a next stage 520, the NAD 180 determines whether it is in an "In Service" area. If so, then at a next stage 540, the NAD 180 deducts one unit from the Standby Counter every second while in this mode. However, if it is in a "No Service" area, at a next stage 530, the NAD 180 deducts a No Service Factor number of units from the Standby Counter while in this mode. At a next stage 560, the NAD 180 determines whether the counter value is greater than zero. If so, the NAD 180 remains in Standby State and determines whether it is still in an "In Service" area 520. Otherwise, the NAD 180 enters Off State 570.

Figure 6:
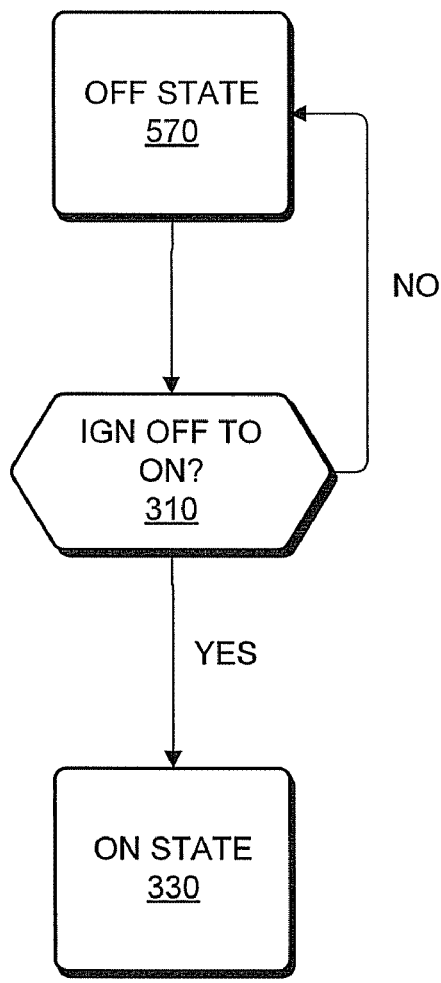
FIG. 6 is a flow diagram showing an exemplary process of switching between Off State and On State.

FIG. 6 shows an exemplary method of a NAD 180 operating in the Off State. In the illustrated example, the NAD 180 remains in Off State 570 until the ignition of the vehicle is turned "on" (310, 330).

Figure 7:
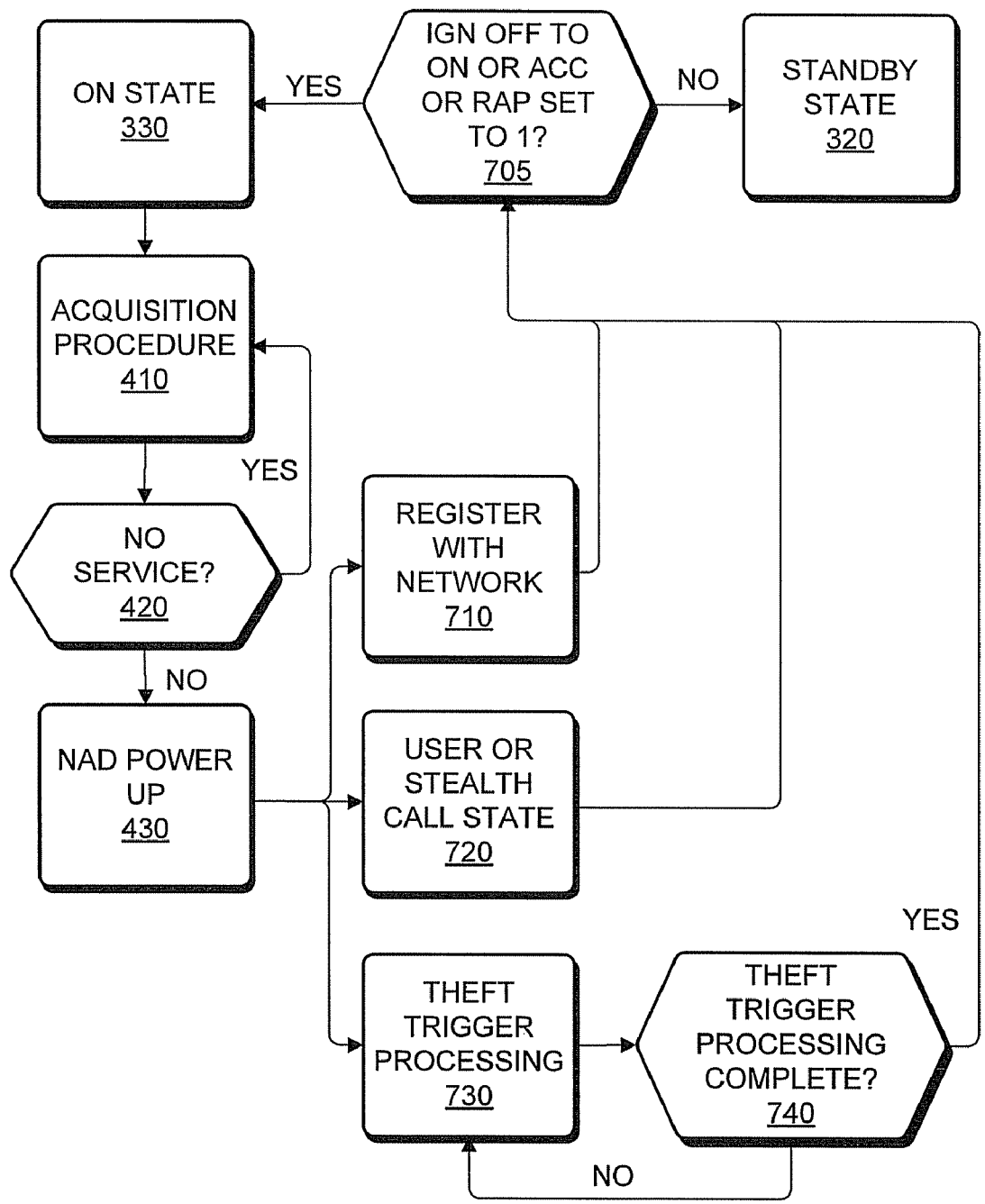
FIG. 7 is a flow diagram showing an exemplary process of operating in different states in accordance with the disclosed principles.
Figure 8:
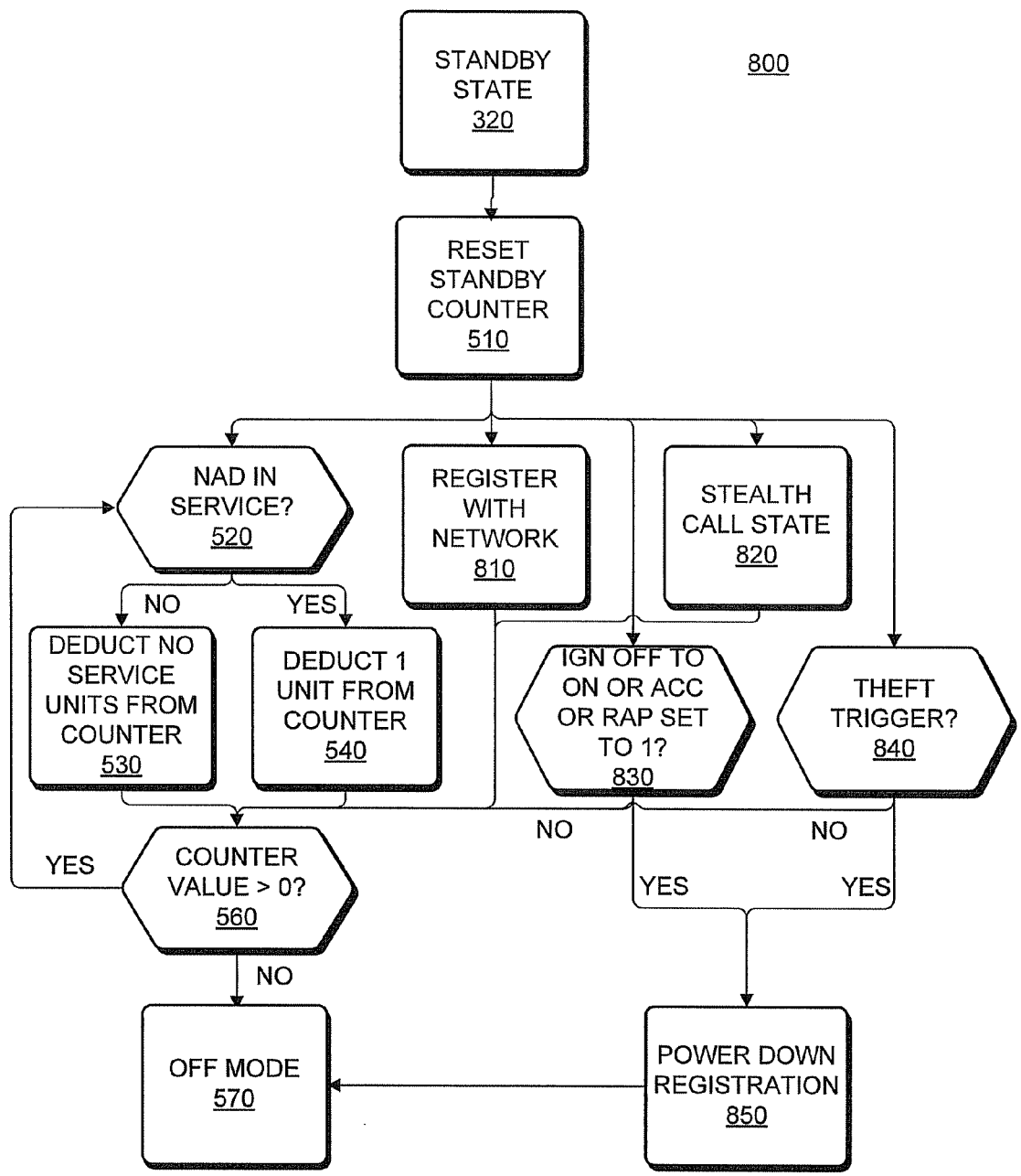
FIG. 8 is a flow diagram showing an exemplary process of operating in different states in accordance with the disclosed principles.
Figure 9:
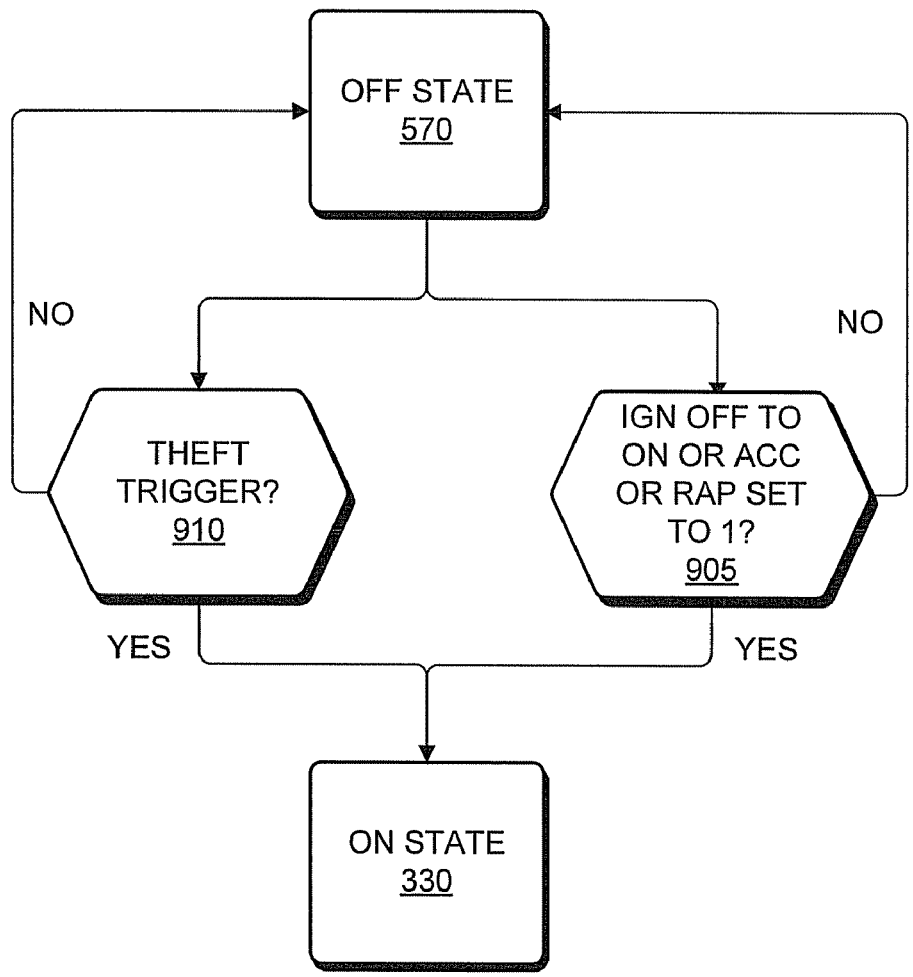
FIG. 9 is a flow diagram showing an exemplary multi-parameter process of switching between Off State and On State.

FIGS. 7-9 are flow diagrams showing exemplary methods according to the disclosed principles for operating within and transitioning between the various modes of operation. FIG. 7 describes another exemplary method 700 of operating within the On State 700. At stage 410, the NAD 180 performs an Acquisition Procedure. At the next stage 420, the NAD 180 determines whether it is in a "No Service" area. If so, the NAD 180 repeats the Acquisition Procedure 410 until it is no longer in a "No Service" Area. If the NAD 180 is not in a "No Service" area (meaning that it is in an "In Service" area), the NAD 180 and the telematics unit power up at stage 430. As a next set of steps, the NAD 180 registers with a wireless network at stage 710, optionally enters a user call or stealth call state at stage 720, and optionally performs theft trigger processing at stage 730. At a next stage 740, after performing theft trigger processing, the NAD 180 determines whether theft trigger processing is complete. If not, the NAD 180 continues theft trigger processing at stage 730. Otherwise, the NAD 180 determines whether the vehicle ignition is turned from "off" to "on" or whether ACC or RAP bit is set to 1 on the local area network (LAN) at decision 705, wherein ACC represents the Accessory State of the vehicle and RAP represents the Retain Accessory Power State of the vehicle.

After registering with the wireless network 710 and entering a user call or stealth call state, the NAD 180 also determines whether the vehicle ignition is turned from "off" to "on" or whether ACC or RAP bit is set to 1 on the LAN at decision 705. If any of these conditions are met, then the NAD 180 enters the On State of stage 330. Otherwise, the NAD 180 enters Standby State at stage 320.

FIG. 8 describes another exemplary method 800 of operation within the Standby State. Assuming at stage 320 that the NAD 180 is in the Standby State, then at stage 510 the NAD 180 resets the Standby Counter. As a set of next steps the NAD 180 (1) determines whether it is in an "In Service" area 520; (2) registers with a wireless network 810; (3) enter a stealth call state 820; (4) determines whether the vehicle ignition is turned from "off" to "on", or the ACC or RAP is set to 1 on the LAN 830; and/or (5) determines whether a theft alarm has been triggered 840. If the NAD 180 determines that it is in an "In Service" area, the NAD 180 deducts one unit from the Standby Counter 540 while in this mode. However, if the NAD 180 is in not in an "In Service" area, then it deducts an amount equal to the No Service Factor from the Standby Counter 530 while in this mode.

At a next stage 560, the NAD 180 determines whether the Standby Counter is greater than zero. If so, the NAD 180 determines again whether the NAD 180 is in an "In Service" area 520. If the Standby Counter is not greater than zero, then the NAD 180 enters Off State 570. After registering with the wireless network 810 or entering the stealth call state 820, the NAD 180 determines whether the Standby Counter is greater than zero at stage 560. At a stage 830, if the NAD 180 determines whether the vehicle ignition is not turned from "off" to "on", or the ACC or RAP is set to 1 on a LAN, or at a stage 840, determines whether a theft alarm has not been triggered, then at a next stage 560, the NAD 180 determines whether the Standby Counter is greater than zero. However, at a stage 830, if vehicle ignition is turned from "off" to "on", or the ACC or RAP is set to 1 on a LAN, or at a stage 840, a theft alarm has been triggered, then at a next stage 850, the NAD 180 powers down registration from the wireless network. At stage 570, the NAD 180 enters Off State.

FIG. 9 describes another exemplary method of operating within the Off State. Assuming at stage 570 that the NAD 180 is in the Off State, then at stage at stage 910 of the method 900, the NAD 180 determines whether the theft alarm has been triggered, or at stage 905, whether the vehicle ignition is not turned from "off" to "on", or the ACC or RAP is set to 1 on a LAN. If either condition is true, the NAD 180 enters On State stage 330. If either condition is false, the NAD 180 continues to stay in Off State stage 570.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for flexible discontinuous receive management in a telematics unit in a vehicle comprising the steps of:
   entering an On State at a network access device of the telematics unit when the vehicle ignition is turned from off to on and entering the Standby State at the network access device when the vehicle ignition is off;
   when in the Standby State, resetting a Standby Counter to an initial value, determining availability of a communications service from a wireless network and if the communication service is not available, operating the telematics unit in a first mode of the Standby State wherein a sleep cycle value of the telematics unit is above a first predetermined threshold and deducting a number of units periodically from the Standby Counter, wherein the number of units is a ratio of the average current drain from a vehicle battery while attempting to access a wireless network when communication service is not available, to the average current drain from the vehicle battery while attempting to access a wireless network when communication service is available;

if the communication service is available, operating the telematics unit in a second mode of the Standby State wherein the sleep cycle value is in a range from zero to the first predetermined threshold, and deducting one unit periodically from the Standby Counter; and determining whether the Standby Counter is greater than zero and entering an Off State if the Standby Counter is not greater than zero.

2. The method according to claim 1, wherein the length of the sleep cycle value in the first mode is determined by the ratio of the average current drain from the vehicle battery by the telematics unit while attempting to access the wireless network when communication service is not available, to the average current drain from the vehicle battery by the telematics unit while attempting to access the wireless network when communication service is available.

3. The method according to claim 1, wherein the length of the sleep cycle value in the second mode is determined by one of analyzing vehicle ignition cycle patterns and notification from the subscriber to the provider.

4. The method according to claim 1, wherein a quotient of the initial value and the value of one unit is equal to an expected battery useful duration when communication service is available, equal to the length of the sleep cycle, and is the first predetermined threshold.

5. The method according to claim 1, further comprising in order:

entering an Off State at the network access device when the Standby Counter is not greater than zero;

remaining in the Off State at the network access device as long as the vehicle ignition is not turned from off to on.

6. The method according to claim 1, wherein the network access device is in Standby State, further comprising the steps of:

registering the network access device with a wireless network;

entering a stealth call state at the network access device;

determining whether the vehicle ignition is turned from off to on;

determining whether the Accessory bit on a local area network is set to a value of 1;

determining whether the Retain Accessory Power bit on a local area network is set to a value of 1;

determining whether the theft alarm of the telematics unit has been triggered; and powering down the registration of the telematics unit from the wireless network.

7. The method according to claim 1, wherein the network access device is in an Off State, further comprising the steps of:

determining whether the Accessory bit on a local area network is set to a value of 1;

determining whether the Retain Accessory Power bit on a local area network is set to a value of 1; and determining whether the theft alarm of the telematics unit has been triggered.

8. A method for flexible discontinuous receive management in a telematics unit in a vehicle, the telematic unit having a network access device having multiple states of operation including an On State operable when the vehicle ignition is on, and a Standby State, wherein the power consumption of the network access device in the On mode is greater than in the Standby state, the method comprising the steps of:

when the vehicle is off, entering the Standby State and determining availability of a communications service from a wireless network, and if the communication service is not available, operating the telematics unit in a first mode of the Standby State with a sleep cycle value above a first predetermined threshold; and if the communication service is available, operating the telematics unit in a second mode of the Standby State with a sleep cycle value between zero and the first predetermined threshold;

initializing a standby counter at the network access device to an initial counter value upon entering the Standby State and determining whether communication service for the device is currently available;

altering the standby counter at regular intervals, wherein the standby counter is altered at each interval by a first amount if communication service is currently not available and by a second amount less than the first amount if communication service for the device is currently available; and determining at the network access device whether the standby counter has reached a predetermined magnitude and entering an Off State at the network access device if the standby counter has reached the predetermined magnitude.

9. The method according to claim 8, further comprising:

attempting to access a wireless network at the network access device while in Standby State;

determining whether communication service for the device is currently available; and switching the network access device to the On State if there is communication service available for the telematics unit, and otherwise repeating the step of attempting to connect to a wireless network at the network access device.

10. The method according to claim 8, further comprising determining that the vehicle ignition has been turned from off to on and in response switching from the Off State to the On State at the network access device.

11. The method according to claim 8, wherein the method further comprises, after entering the Standby State, the steps of: registering the network access device with a communication network; and entering a stealth call state at the network access device.

12. The method according to claim 8, wherein a ratio of the second amount to the first amount is substantially the same as the ratio of the average current drain from a vehicle battery by the network access device while attempting to access a wireless network when communication service for the device is currently not available to the average current drain from the vehicle battery by the network access device when communication service for the device is currently available.

13. The method according to claim 8, wherein a quotient of the predetermined magnitude and the first amount is equal to an expected battery useful duration when communication service is not available.

14. The method according to claim 8, wherein a quotient of the initial counter value and the first amount is equal to an expected battery useful duration when communication service is available.

* * * * *